(12) United States Patent
Lo (10) Patent No.: US 10,609,358 B2
(45) Date of Patent: *Mar. 31, 2020

(54) METHOD AND APPARATUS FOR TAKING AND DISPLAYING MULTI-VIEW ORTHOSTEREOSCOPIC 3D IMAGES

(71) Applicant: 3DV Co. Ltd., Chai Wan (HK)

(72) Inventor: Kwok Wah Allen Lo, Causeway Bay (HK)

(73) Assignee: 3DV Co. Ltd., Chai Wan (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/186,989

(22) Filed: Nov. 12, 2018

(65) Prior Publication Data

US 2019/0149801 A1 May 16, 2019

Related U.S. Application Data

(63) Continuation of application No. 15/308,409, filed as application No. PCT/US2015/029219 on May 5, 2015, now Pat. No. 10,129,529.

(60) Provisional application No. 61/993,003, filed on May 14, 2014.

(51) Int. Cl.
| | |
|---|---|
| *H04N 13/225* | (2018.01) |
| *H04N 13/128* | (2018.01) |
| *H04N 13/229* | (2018.01) |
| *H04N 13/305* | (2018.01) |
| *H04N 13/31* | (2018.01) |

(Continued)

(52) U.S. Cl.
CPC ....... *H04N 13/225* (2018.05); *G02B 27/2214* (2013.01); *H04N 13/128* (2018.05); *H04N 13/229* (2018.05); *H04N 13/305* (2018.05); *H04N 13/31* (2018.05); *H04N 13/351* (2018.05)

(58) Field of Classification Search
CPC .. H04N 13/225; H04N 13/351; H04N 13/305; H04N 13/31; H04N 13/128; H04N 13/229; G02B 27/2214
See application file for complete search history.

(56) References Cited

U.S. PATENT DOCUMENTS

| | | | | |
|---|---|---|---|---|
| 5,076,687 A | * | 12/1991 | Adelson | G01C 3/08 |
| | | | | 250/201.7 |
| 10,129,529 B2 | * | 11/2018 | Lo | G02B 27/2214 |

(Continued)

*Primary Examiner* — James M Pontius
(74) *Attorney, Agent, or Firm* — Ware, Fressola, Maguire & Barber LLP (57) ABSTRACT

An imaging system includes a camera, a display panel and a processor for providing image data to the display panel. The camera has a sensor with pixel rows for capturing an image taken by a camera lens through a lenticular sheet with first lenticules, such that each first lenticule covers at least two pixel rows. The display panel is used to show a displayed image based on the image data. The display panel is covered by a viewing lenticular sheet with second lenticules. The displayed image has a plurality of segments, with each segment under a second lenticule and each segment has sub-segments corresponding to pixel rows under a first lenticule. Image data provided to the image display panel is arranged such that image contents in the sub-segments under each second lenticule and image contents in the pixel rows under each first lenticule have different arrangement orders.

16 Claims, 10 Drawing Sheets (51) Int. Cl.
*G02B 27/22* (2018.01)
*H04N 13/351* (2018.01)

(56) References Cited

U.S. PATENT DOCUMENTS

| | | | | |
|---|---|---|---|---|
| 2003/0026474 A1* | 2/2003 | Yano | ............ | G02B 27/2214 |
| | | | | 382/154 |
| 2013/0044372 A1* | 2/2013 | Lo | ............ | G02B 5/201 |
| | | | | 359/463 |
| 2014/0029094 A1* | 1/2014 | Kroon | ............ | G09G 3/3208 |
| | | | | 359/463 |

* cited by examiner

METHOD AND APPARATUS FOR TAKING AND DISPLAYING MULTI-VIEW ORTHOSTEREOSCOPIC 3D IMAGES

CROSS REFERENCE TO RELATED APPLICATION

This application is a continuation of U.S. application Ser. No. 15/308,409 filed on Nov. 2, 2016, which is the U.S. National Stage of International Application Number PCT/US2015/029219 filed on May 5, 2015 which was published on Nov. 19, 2015 under International Publication No. WO 2015/175264, and which claims the benefit of U.S. Provisional Application No. 61/993,003, filed May 14, 2014. Each of the above-identified applications is hereby incorporated by reference in their entirety.

FIELD OF THE INVENTION

The present invention relates generally to photographic imaging and, more specifically, to the taking and displaying of 3D images.

BACKGROUND OF THE INVENTION

Figure 1:
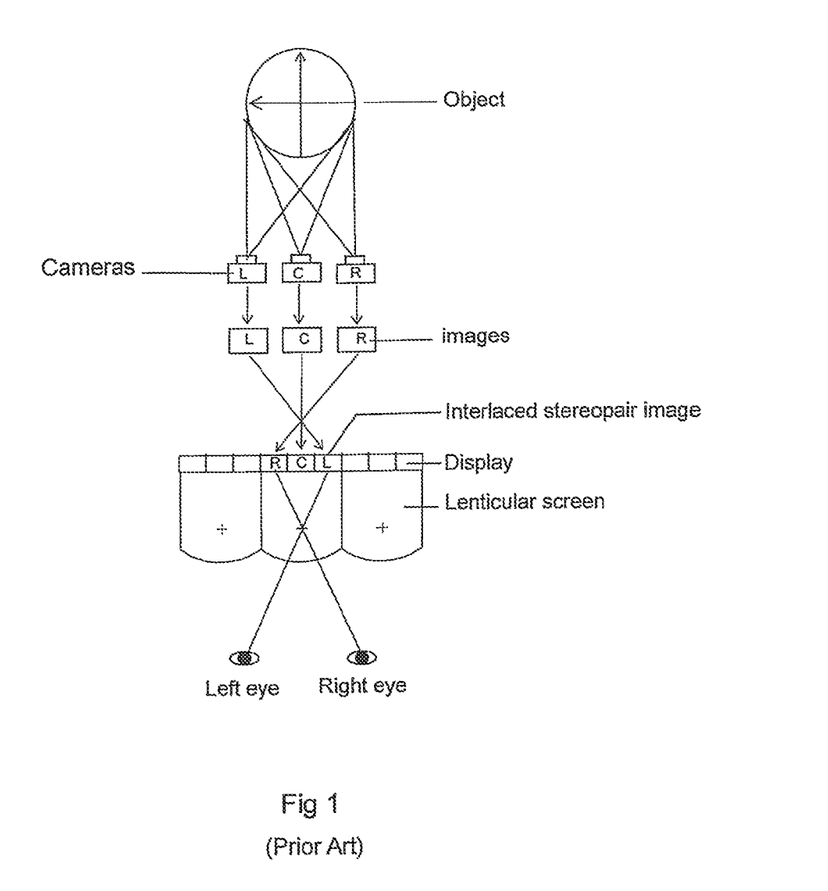
FIG. 1 illustrates a prior art 3D imaging system.

Currently lenticular screen-type multi-view 3D image is produced by composing a sequence of strip-like images to be viewed under a lenticular screen. The compressed images are composed from a series of images taken by a number of cameras at different viewing angles. As shown in FIG. 1, three cameras or camera lenses with associated image sensors are used to take the pictures of an object to produce three component images: a left image L, a center image C, and a right image R. Each of the component images is divided into a plurality of image strips and the image strips from all the component images are arranged into a composite image for display. A lenticular screen is imposed over the display such that each lenticule substantially covers a strip of the composite image that includes an image strip from each of all the component images. In FIG. 1, the composite image strip is referred to as an interlaced stereopair image. Through each lenticule of the lenticular screen, the left eye of a view can see the image strip from the left image and the right eye of the viewer can see the image strip from the right image. As such, the viewer sees a 3D image of the object.

The disadvantages of the current method of composing a 3D image for viewing include:

1. Complicated process in the making of the composite image;
2. The multi-camera lenses must be substantially identical so as to produce the component images of same size and shade—the camera lenses must have identical focal length and the image sensors must have the same color balance, etc.
3. A multi-lens camera with fixed separation of lenses is usually not suitable for taking pictures of an image at a close-up object because the parallax between images will be too great.

SUMMARY OF THE INVENTION

The present invention uses one camera lens to capture the image of an object and record the captured image in an image sensor via a lenticular screen. The image portion under each lenticule of the lenticular screen is rearranged or flipped by an electronic processor to form a rearranged image. The image data from the rearranged image is conveyed to a display to be viewed through a viewing lenticular screen or a parallax barrier. Because of the flipping or rearrangement of the image portions, a viewer can see a stereoscopic image and not a pseudo-stereoscopic image.

Thus, one aspect of the present invention is an imaging system, comprising:

a camera, an image display, and an image processor, wherein the camera comprises:

a first parallax sheet comprising a plurality of first parallax separation units, each first parallax separation unit having a first unit width and a longitudinal axis, a camera lens arranged to form an image, and an image sensor configured to capture the image through the first parallax sheet to form a sensed image having a plurality of image strips, each image strip having a strip width substantially equal to the first unit width of the first parallax separation units; the image processor configured to provide image data indicative of the sensed image to the image display; and the image display comprises:

a display panel arranged to display a displayed image indicative of the image data, the displayed image comprising a plurality of display segments, each display segment corresponding to an image strip, and each of the display segments has a segment width, and a second parallax sheet placed over the display panel, the second parallax sheet comprising a plurality of second parallax separation units, each second parallax separation unit having a second unit width substantially equal to the segment width of the display segments.

According to an embodiment of the present invention, the image sensor comprises a plurality of pixel rows arranged substantially parallel to the longitudinal axis of the first parallax separation unit, and each of the image strips in the sensed image comprises a plurality of compressed image strips, each compressed image strip indicative of sensed data in a pixel row, and each of the display segments comprises a plurality of display sub-segments, each of the display sub-segments corresponding to one of said plurality of compressed image strips, and wherein the image data is arranged to provide a spatial relationship between the display segments in the display image and the second parallax separation units of the second parallax sheet on the display panel.

According to an embodiment of the present invention, each of the compressed image strips has a sensed image content, and each of the display sub-segments has a displayed image content, wherein the sensed image contents in each image strip are arranged in a first order according to the compressed image strips in said each image strip, and the image processor is configured to change the first order into a different second order such that the displayed image contents in each display segment are arranged in the second order.

According to an embodiment of the present invention, the second parallax sheet is arranged such that each of the second parallax separation units substantially covers one display segment, and wherein the second order is a reversed order of the first order.

According to an embodiment of the present invention, the plurality of compressed image strips comprise a first compressed strip and a last compressed strip, and said plurality of display sub-segments comprise a first sub-segment and a last sub-segment, and wherein the image processor is configured to arrange the image data such that the displayed image content of the first sub-segment is indicative of the sensed image content of the last compressed strip, and the displayed image content of the last sub-segment is indicative of the sensed image content of the first compressed strip.

According to an embodiment of the present invention, the plurality of compressed image strips comprise first N compressed strips and last N compressed strip, and said plurality of the display sub-segments comprise first N sub-segments and last N sub-segments, N being an integer greater than 1, and wherein the image processor is configured to arrange the image data such that the display image content of the first N sub-segments is indicative of the sensed image content of the last N compressed strips, and the display image content of the last N sub-segments is indicative of the sensed image content of the first N compressed strips, and wherein the second parallax sheet is arranged such that each of the second parallax separation units substantially covers one display segment.

According to an embodiment of the present invention, each of the compressed image strips has a sensed image content, and each of the display sub-segments has a displayed image content, and wherein said plurality of compressed image strips comprise a first compressed strip and a last compressed strip, and said plurality of display sub-segments comprise a first sub-segment and a last sub-segment, the displayed image content of the first sub-segment indicative of the sensed image content of the first compressed strip and the displayed image content of the last sub-segment indicative of the sensed image content of the last compressed strip, and wherein the second parallax sheet is arranged such that each of the second parallax separation units substantially covers one display segment, and wherein the sensed image contents in each image strip are arranged in an order according to the compressed image strips in said each image strip, and wherein the image processor is configured to arrange the image data such that the display segment under a second parallax separation unit comprises the displayed image content of the last sub-segment of a display segment and the displayed image content of the first sub-segment of an adjacent display segment.

According to an embodiment of the present invention, each of the compressed image strips has a sensed image content, and each of the display sub-segments has a displayed image content, and wherein said plurality of compressed image strips comprise first N compressed strips and last N compressed strips, and said plurality of display sub-segments comprise first N sub-segments and last N sub-segments, the displayed image contents of first N sub-segments indicative of the sensed image contents of first N compressed strips and the displayed image contents of last N display sub-segments indicative of the sensed image contents of last N compressed strips, and wherein the second parallax sheet is arranged such that each of the second parallax separation units substantially covers one display segment, and wherein the sensed image contents in each image strip are arranged in an order according to the compressed image strips in said each image strip, and wherein the image processor is configured to arrange the image data such that the display segment under a second parallax separation unit comprises the displayed image contents of last N display sub-segments of a display segment and the displayed image contents of first N sub-segments of an adjacent display segment.

According to an embodiment of the present invention, each of the first parallax sheet and the second parallax sheet comprises a lenticular screen, and each of the first parallax separation unit and the second parallax separation unit comprises a lenticule.

According to an embodiment of the present invention, each of the first parallax sheet and the second parallax sheet comprises a parallax barrier, and each of the first parallax separation unit and the second parallax separation unit comprises a barrier unit.

According to an embodiment of the present invention, one of the first parallax sheet and the second parallax sheet comprises a lenticular screen, and another one of the first parallax sheet and the second parallax sheet comprises a parallax barrier.

According to an embodiment of the present invention, the display panel comprises one of a liquid crystal display, an OLED display and a CRT display.

According to an embodiment of the present invention, the image display is provided in one of a mobile device, a tablet and a television set.

Another aspect of the present invention is an imaging display system, comprising:

an image display, and an image processor configured to provide image data to the image display, the image data indicative of a sensed image, wherein the sensed image is formed by a camera lens and captured in an image sensor through a first parallax sheet, the first parallax sheet comprising a plurality of first parallax separation units, each first parallax separation unit having a first unit width and a longitudinal axis; and wherein the image display comprises:

a display panel arranged to display a displayed image indicative of the image data, the displayed image comprising a plurality of display segments, each display segment corresponding to an image strip, and each of the display segments has a segment width, and a second parallax sheet placed over the display panel, the second parallax sheet comprising a plurality of second parallax separation units, each second parallax separation unit having a second unit width substantially equal to the segment width of the display segments.

According to an embodiment of the present invention, the image sensor comprises a plurality of pixel rows arranged substantially parallel to the longitudinal axis of the first parallax separation unit, and each of the image strips in the sensed image comprises a plurality of compressed image strips, each compressed image strip indicative of sensed data in a pixel row, and wherein each of the display segments comprises a plurality of display sub-segments, each of the display sub-segments corresponding to one of said plurality of compressed image strips, and wherein the image data is arranged to provide a spatial relationship between the display segments in the display image and the second parallax separation units of the second parallax sheet on the display panel.

According to an embodiment of the present invention, each of the compressed image strips has a sensed image content, and each of the sub-segments has a displayed image content, wherein the sensed image contents in each image strip are arranged in a first order according to the compressed image strips in said each image strip, and wherein the image processor is configured to change the first order into a different second order such that the displayed image contents in each display segment are arranged in the second order.

According to an embodiment of the present invention, the second parallax sheet is arranged such that each of the second parallax separation units substantially covers one display segment, and wherein the second order is a reversed order of the first order.

According to an embodiment of the present invention, the second parallax sheet comprises a lenticular screen, and the second parallax separation unit comprises a lenticule.

According to an embodiment of the present invention, the second parallax sheet comprises a parallax barrier, and the second parallax separation unit comprises a barrier unit.

According to an embodiment of the present invention, the display panel comprises one of a liquid crystal display, an OLED display and a CRT display and wherein the image display is provided in one of a mobile device, a tablet and a television set.

BRIEF DESCRIPTION OF THE DRAWINGS

For a fuller understanding of the nature and objects of the present invention, references are made to the detailed description taken in conjunction with the drawings of FIGS. 2-18B.

DESCRIPTION OF THE INVENTION

Figure 2:
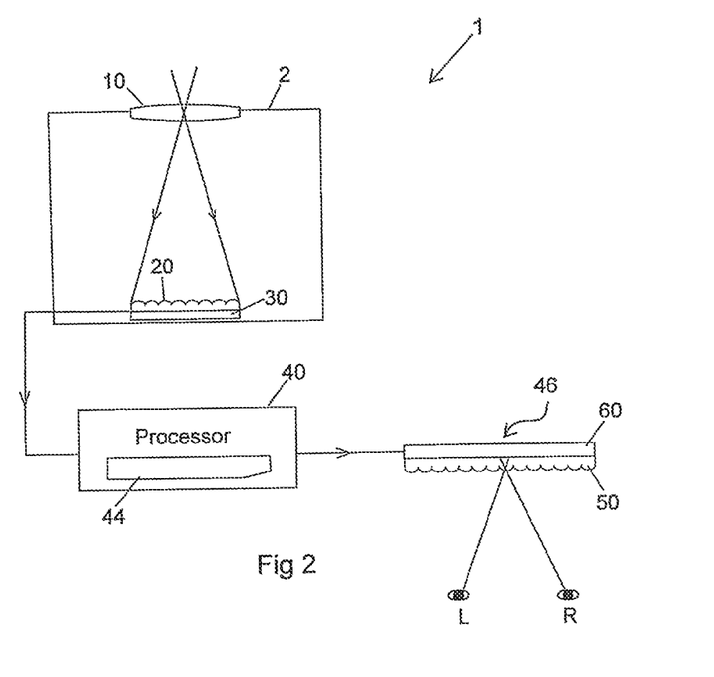
FIG. 2 illustrates a 3D imaging system, according to one embodiment of the present invention.

The present invention provides a 3D imaging system wherein a single camera lens is used to form the image of an object and the formed image is captured in an image sensor through a parallax separation sheet, such as a lenticular screen or a parallax barrier. As shown in FIG. 2, the 3D image system 1 includes a camera 2 for forming the image of an object by a camera lens 10 though a lenticular screen or parallax barrier 20. The formed image is captured in an image sensor 30. The image content or data is processed by an image processor 40. The image processor 40 may have one or more memory units 44 to record or store the processed image data. The processed image data is conveyed to an image display apparatus or unit 46 having a display panel 60 so as to allow the displayed image to be viewed through a viewing lenticular screen or parallax barrier 50.

Figure 3:
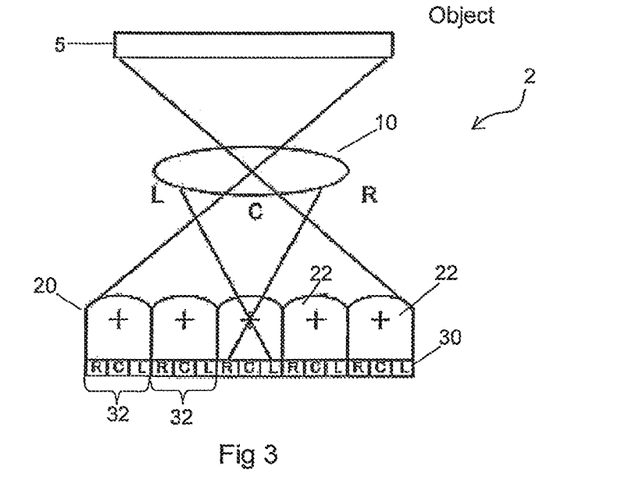
FIG. 3 illustrates a 3D camera, according to one embodiment of the present invention.

FIG. 3 illustrates a camera, according to an embodiment of the present invention. As shown in FIG. 3, the lenticular screen 20 has a plurality of lenticules 22, each of which is a cylindrical lens have a width and a length along a longitudinal axis (see FIG. 4). The sensor 30 has a plurality of pixel rows located under the lenticular screen 20 such that the pixel rows are substantially parallel to the longitudinal axis of the lenticules 22 and there are N pixel rows under each lenticle 22, with N being a positive integer equal to or greater than 2. In the example as shown in FIG. 3, there are three pixel rows in an image sensor strip 32 under each lenticule 22. In FIG. 3, each of the image sensor strips 32 records a part of the image of the object 5 formed by the camera lens 10 and further compressed by the associated lenticule 22. In each image sensor strip 32 as shown in FIG. 3, the compressed image in the pixel row R is formed by the right portion of the camera lens 10, the compressed image in the pixel row C is formed by the middle portion of the camera lens 10 and the compressed image in the pixel row L is formed by the left portion of the camera lens 10.

Figure 4:
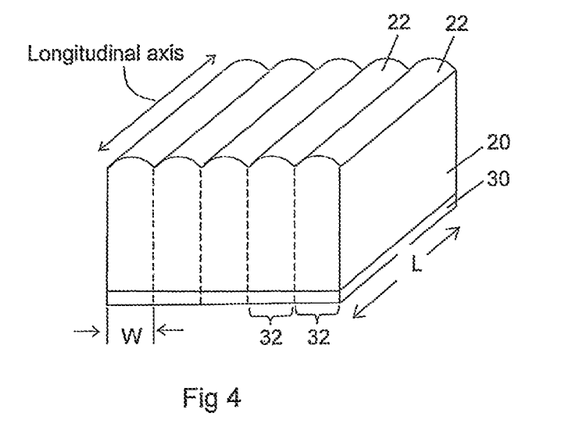
FIG. 4 is an isometric view of a lenticular screen and the underlying image sensor.

FIG. 4 is an isometric view of a lenticular screen and the underlying image sensor. As shown in FIG. 4, the image sensor 30 has a plurality of image sensor strips 32. The width W of each image sensor strip is substantially equal to the width of the lenticules 22 and the relevant length L of the image sensor strip is the same as the length of the lenticules 22. It should be noted that the length L of the image sensor strips 32 can be smaller or greater than the length of the lenticules 22 and the total width of the image sensor 30 can be smaller or greater than the total width of the lenticular screen 20. However, only the part of the image sensor 30 that is covered by the lenticular screen 20 is relevant to the present invention. Thus, what the image sensor 30 records or captures is a sensed image and the sensed image in each of the image sensor 32 is an image strip, and each image strip has a strip width substantially equal to the width of the lenticule 22.

Figure 5:
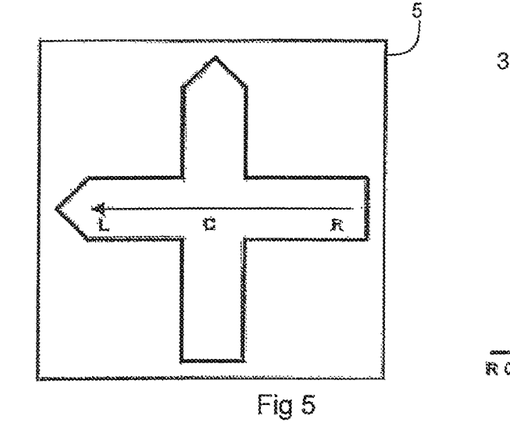
FIG. 5 shows the front view of an object.
Figure 6A:
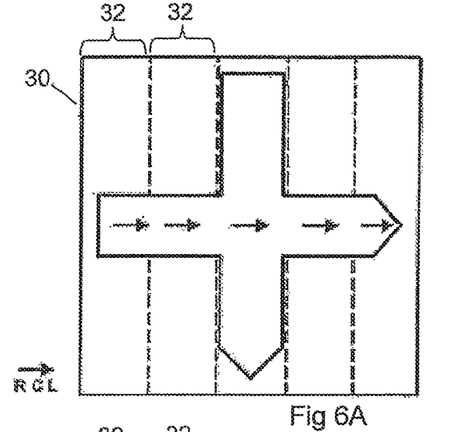
FIG. 6A illustrates an image sensor having an image of the object.
Figure 6B:
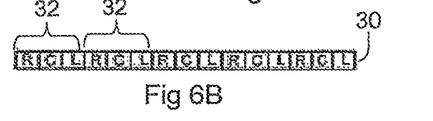
FIG. 6B is a schematic representation of the image sensor shown in FIG. 6A.

To illustrate the principle of the present invention, a simple object 5 as shown in FIG. 5 is used. As shown in FIG. 5, an arrow having a left portion L, a center portion C and a right portion R is pointing from right to left. FIG. 6A illustrates an image sensor having an image of the object. As shown in FIG. 6A, the image of the object appears to be rotated by 180 degrees by the camera lens 10 through the image formation process. Each of the image sensor strips 32 on the image sensor 30 has only a portion of the image and each of the image portions is shown with a short arrow. The short arrow is used to keep track of the left-right direction of the image content in an image portion of the object under each lenticule. FIG. 6B is a schematic representation of image sensor having an image of the object. As shown in FIG. 6B, each image sensor strip 32 on the image sensor 30 has three rows of pixels, separately labeled as R, C, L similarly to those shown in FIG. 3. The label R, C, L of each image sensor strip 32 is also consistent with the short arrows as shown in FIG. 6A.

Figure 7A:
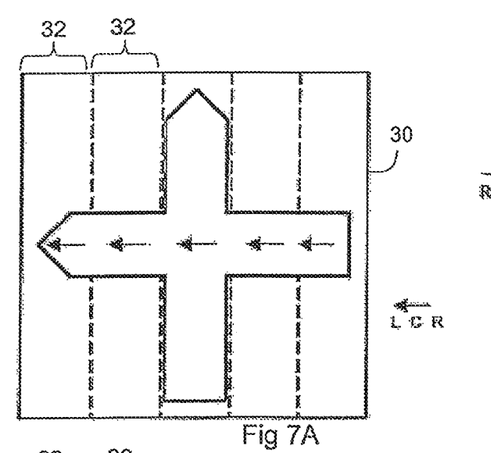
FIG. 7A shows the image sensor of FIG. 6A being rotated 180 degrees.
Figure 7B:
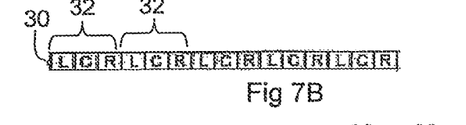
FIG. 7B is a schematic representation of image sensor shown in FIG. 7A.
Figure 8A:
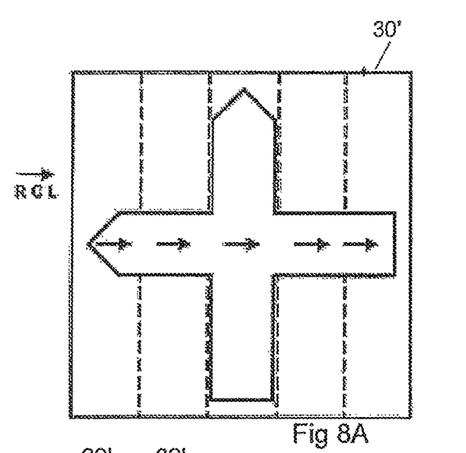
FIG. 8A illustrates a rearranged image sensor.
Figure 8B:
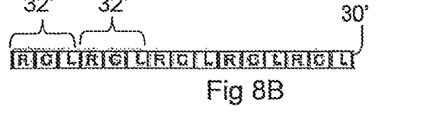
FIG. 8B is a schematic representation of rearranged image sensor shown in FIG. 8A.

FIG. 7A shows the image sensor of FIG. 6A rotated by 180 degrees and FIG. 7B is a schematic representation of image sensor shown in FIG. 7A. According to an embodiment of the present invention, before the image content on the image sensor 30 as shown in FIG. 7A is provided to a display panel 60 for viewing (see FIG. 2), the image content in the image strip on each image sensor strip 32 is rearranged or flipped as illustrated in FIGS. 8A and 8B. For illustration purposes only, within each image sensor strip 32, the image content of pixel row R and the image content of pixel row L are swapped or interchanged. After the flipping or rearrangement of the image content in the pixel rows, each image sensor strip 32 in FIG. 7B now becomes an image sensor strip 32' as shown in FIG. 8B. The resulting image of the object on image sensor 30 shown in FIG. 7A now becomes the image of the object as shown in FIG. 8A. In order to distinguish the image sensor 30 having the original image content and the image sensor having the rearranged image content, the image sensor having the rearranged image content is denoted as image sensor 30' although physically the sensors 30 and 30' are the same one. Therefore, the image content on image sensor 30 and on image sensor 30' as shown in FIG. 6A-FIG. 13C are synonymous to a sensed image and a processed image. Likewise, the image content on image sensor strip 32 and on image sensor strip 32' are synonymous to an image strip and a processed image strip. Furthermore, the compressed images in pixel rows R, C and L in each image sensor strip 32 as shown in FIG. 3 are synonymous to compressed image strips in an image strip.

As shown in FIG. 8A, the image of the object on the image sensors 30' appears to be same as the image of the object on the image sensor 30 as shown in FIG. 7A. However, the pointing direction of the short arrows in FIG. 8A is opposite to the pointing direction of the short arrows in FIG. 7A due to the flipping or rearrangement of the image content within each image sensor strip.

Figure 9:
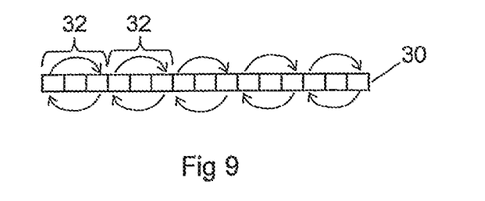
FIG. 9 illustrates the pixel rearrangement in an image sensor as shown in FIG. 7B to form the rearranged image sensor of FIG. 8B.
Figure 10:
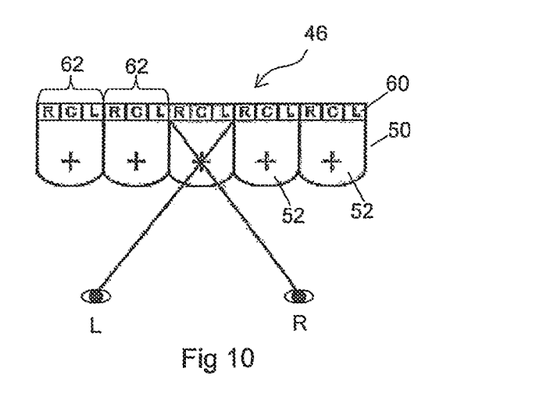
FIG. 10 illustrates the viewing of a display through a viewing lenticular screen.
Figure 14:
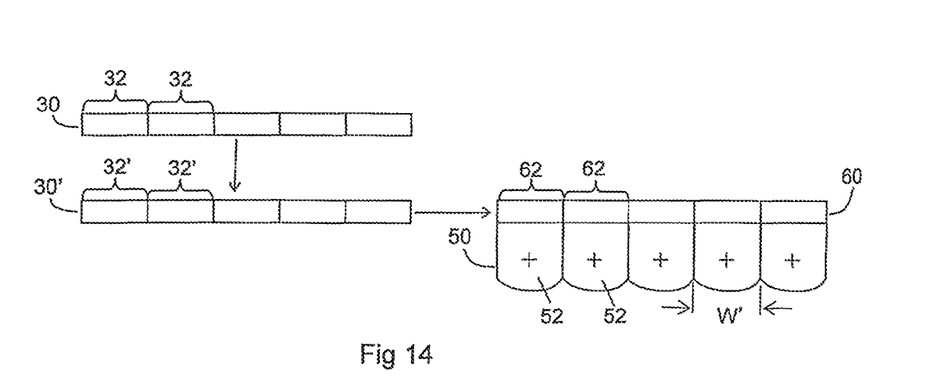
FIG. 14 illustrates the process of making a 3D display according to the embodiment as shown in FIGS. 9, 11, 12 and 13.

FIG. 9 illustrates the pixel rearrangement in an image sensor as shown in FIG. 7B to form the rearranged image sensor of FIG. 8B. It is understood that while the physical pixels and pixel rows remain the same, the image content in the pixel rows are rearranged. After the image content in the pixel rows within each image sensor strip is rearranged, the image content on the image sensor 30' is provided to a display panel 60 so that the image of the object as displayed on the display panel 60 can be viewed through a viewing lenticular screen 50 as shown in FIG. 10. The viewing lenticular screen 50 has a plurality of lenticules 52. As shown in FIGS. 10 and 14, the displayed image on the display panel 60 has a plurality of display segments 62, and each of the display segments 62 is located under a lenticular 52. Each of the display segments 62 is corresponding to a processed image strip, and the width of the displayed segments 62 is substantially equal to width of the lenticular 52. As the image content on image sensor 30 as shown in FIG. 3 is synonymous to a sensed image; the image content on image sensor strip 32 is synonymous to an image strip, and the compressed images in pixel row R, C and L in each image sensor strips 31 are synonymous to compressed image strips in an image strip, the image display on the display panel 60 as shown in FIG. 10 is synonymous to a displayed image, the image sub-segments R, C, L under each display segment 62 are synonymous to display sub-segments.

In general, the size of the display 60 in the display unit 46 is much larger than the image sensor 30 in the camera, and the size of the viewing lenticular screen 50 is much larger than the lenticular screen 20 in the camera 2 (FIG. 3). Accordingly, the width of the display segment 62 is much greater than the width of the image sensor strips 32' in the image sensor 30' (FIG. 8B). Thus, the image processor 40 in the image system 1 (see FIG. 2) is configured to perform the image content rearrangement as well as to provide the rearranged image content on the image sensor 30' to a driver (not shown) of the display panel 60 to suit the size of the display panel 60. As shown in FIG. 10, the left eye of a viewer would see the compressed image strip L in each of the display segment 62 and the right eye would see the compressed image strip R. As such, the image of the object as seen by the viewer would be a stereoscope or orthostereoscopic 3D image, and not a pseudo-stereoscopic 3D image. In the example as shown in FIG. 3, each of the image strip 32 in the sensed image 30 has at least two pixel rows and each of the pixel rows has a sensed image content shown as R, C or L. As shown in FIG. 10, each of the display segments 62 has at least two display sub-segments and each of the display sub-segments is corresponding to one of the pixel rows. As shown in FIG. 14, the display segment 62 in the displayed image on the display panel 60 has the image content of a processed image strip 32' in the processed image 30'. Thus, the displayed image content of a display sub-segment is corresponding to the sensed image content in a compressed image strip. Furthermore, the displayed image content of a display segment is corresponding to the image data in an image strip after the image data has been processed and rearranged by the image processor. In general, the rearrangement of the image data by the image processor is to provide a spatial relationship between the display segments 62 in the display image and the lenticules 52 of the lenticular sheet 50.

Figure 11A:
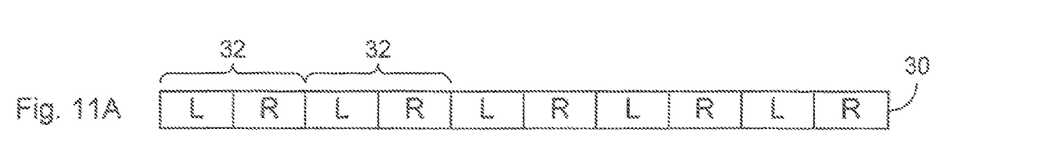
FIG. 11A illustrates an image sensor strip having two pixel rows in each strip.
Figure 11B:
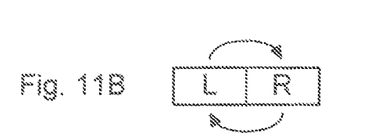
FIG. 11B illustrates the pixel rearrangement in a sensor strip as shown in FIG. 11A by way of image flipping.
Figure 11C:
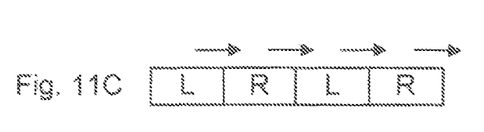
FIG. 11C illustrates the pixel rearrangement in a sensor strip as shown in FIG. 11A by way of image shifting from one pixel to the next.

FIGS. 7B, 8B and 9 have been used to illustrate the image content rearrangement in an image sensor wherein each image sensor strip has three pixel rows. FIG. 11A illustrates an image sensor 30 wherein each strip 32 has two pixel rows L, R. In order to rearrange the image content on the image sensor 30, it is possible the interchange the image content in pixel row R with the image content in pixel row L as shown in FIG. 11B. In a different embodiment of the other embodiment of the present invention, the image content in one pixel row is shifted to the adjacent pixel row as shown in FIG. 11C. After the image content rearrangement as shown in FIG. 11B or FIG. 11C, each image sensor strip 32 in FIG.

Figure 11D:
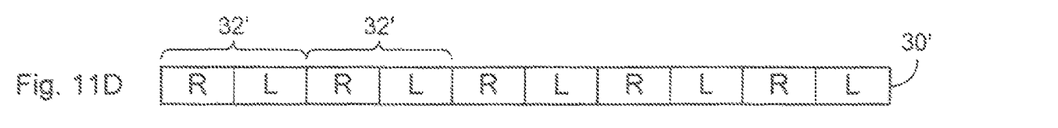
FIG. 11D illustrates the image sensor of FIG. 11A after pixel rearrangement.

11A now becomes an image sensor strip 32' as shown in FIG. 11D. The resulting image of the object on image sensor 30 shown in FIG. 11A now becomes the image of the object on image sensor 30' as shown in FIG. 11D.

Figure 12A:
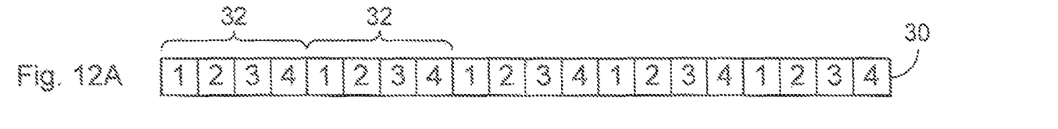
FIG. 12A illustrates an image sensor strip having four pixel rows in each strip.
Figure 12B:
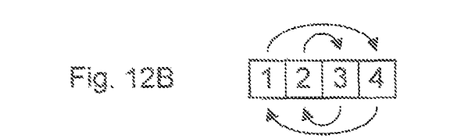
FIG. 12B illustrates the pixel rearrangement in a sensor strip as shown in FIG. 12A by way of image flipping.
Figure 12C:
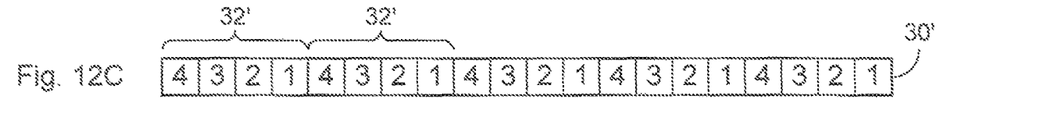
FIG. 12C illustrates the image sensor of FIG. 12A after pixel rearrangement.

FIG. 12A illustrates an image sensor 30 wherein each image sensor strip 32 has four pixel rows 1, 2, 3, 4. FIG. 12B illustrates the pixel rearrangement in an image sensor strip as shown in FIG. 12A by way of image flipping. As shown, the image content in pixel row 1 and the image content in pixel row 4 are swapped and the image content in pixel row 2 and the image content in pixel row 3 are swapped. FIG. 12C illustrates a rearranged image sensor of FIG. 12A.

Figure 12D:
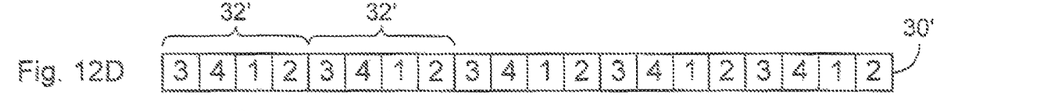
FIG. 12D illustrates the image sensor of FIG. 12A after the pixels being shifted.

In a different embodiment of the present invention, the image content in two pixel rows in an image strip 32 are shifted to the adjacent image strip, such that the rearranged image sensor 30' would have the image strips 32' as shown in FIG. 12D.

Figure 13A:
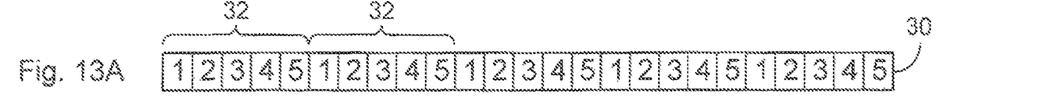
FIG. 13A illustrates an image sensor strip having five pixel rows in each strip.
Figure 13B:
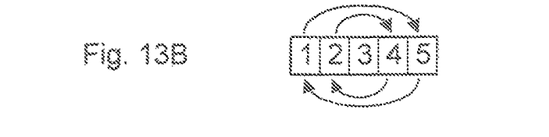
FIG. 13B illustrates the pixel rearrangement in a sensor strip as shown in FIG. 13A by way of image flipping.
Figure 13C:
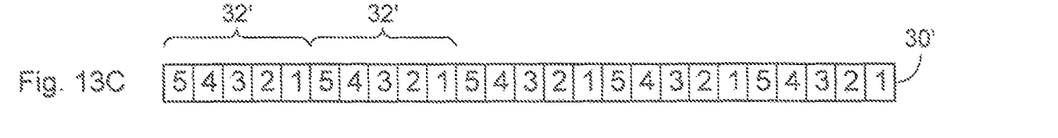
FIG. 13C illustrates the image sensor of FIG. 13A after pixel rearrangement.

FIG. 13A illustrates an image sensor strip 30 wherein each image strip 32 has five pixel rows 1, 2, 3, 4 and 5. FIG. 13B illustrates the pixel rearrangement in an image sensor strip as shown in FIG. 13A by way of image flipping. As shown, the image content in pixel row 1 and the image content in pixel row 5 are swapped and the image content in pixel row 2 and the image content in pixel row 4 are swapped. FIG. 13C illustrates a rearranged image sensor of FIG. 13A.

In the examples as shown in FIGS. 9, 11b, 12b and 13b, the image content rearrangement in the image sensor is to change the order of the compressed image strips in each image strip 32 into a different order as shown in the processed image strip 32'. In particular, the order of the compressed image strips in the processed image strip 32' is the reversed order of the compressed image strips in the image strip 32. Since the sensed image content of the compressed image strips in the processed image strip 32' is the same as the displayed image content of the display sub-segments in the displayed segment 62 as shown in FIG. 14, the order of the display sub-segments in the display segment 62 is the reversed order of the compressed image strips in the image strip 32. In this type of image data rearrangement, as can be seen in FIGS. 9, 11(a) and 11(d), the displayed image content of the first display sub-segment in a display segment 62 is indicative of the sensed image content of the last compressed image strip in an image strip 32. Likewise, the displayed image content of the last display sub-segment in a display segment 62 is indicative of the sensed image content of the first compressed image strip in an image strip 32. When each image strip 32 has four or more compressed image strips as shown in FIGS. 12(a) and 13(a), the displayed image content of the first two display sub-segments in a display segment 62 (FIGS. 12(c) and 13(c)) is indicative of the sensed image content of the last two compressed image strips in an image strip 32. Likewise, the displayed image content of the last two display sub-segments in a display segment 62 is indicative of the sensed image content of the first two compressed image strips in an image strip 32.

In the embodiments as shown in FIGS. 9, 11, 12 and 13, the image content of an image sensor 30 having a plurality of image strips 32 is processed to become the image content of a rearranged image sensor 30' having a plurality of image strips 32'. The image content in the rearranged image sensor 30' is then conveyed to a display panel 60 to form a displayed image having a plurality of display segments 62, each display segment 62 corresponding to an image strip 32'. As a lenticular screen 50 having a plurality of lenticules 52 is placed over the display panel 60 with each lenticule 52 substantially aligning with a display segment 62 as shown in FIG. 14. As shown, the lenticular width W' of the viewing lenticular screen 60 is substantially equal to (or slightly smaller than) the width of a display segment 62. As such a viewer would be able to see an ortho-stereoscopic 3D image as shown in FIG. 2.

Figure 15:
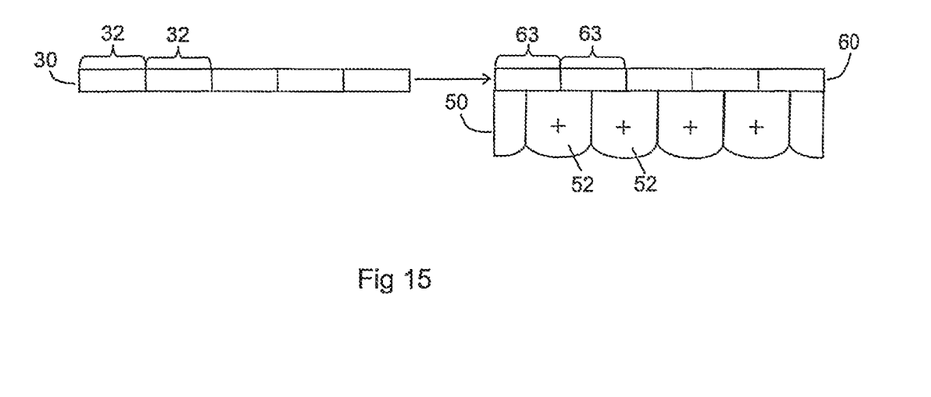
FIG. 15 illustrates a different embodiment of the present invention.

In a different embodiment of the present invention, it is possible to skip the pixel arrangement step in which an image sensor 30 having a plurality of image strips 32 is processed to become a rearranged image sensor 30' having a plurality of image strips 32'. As shown in FIG. 15, the image content in the image sensor 30 having a plurality of image strip 32 is conveyed to the display panel 60 to form a displayed image having a plurality of display segments 63, each display segment 63 corresponding to an image strip 32. A lenticular screen 50 having a plurality of lenticules 52 is placed over the display panel 60 such that each lenticule 52 covers one half of a display segment 63 and one half of an adjacent segment 63. As such a viewer would be able to see an ortho-stereoscopic 3D image as shown in FIG. 2.

By comparing the embodiment as shown in FIG. 15 to the embodiment as shown in FIG. 14, the viewing lenticular screen 50 as shown in FIG. 15 is shifted in a direction perpendicular to the longitudinal axis of the lenticules by a distance substantially equal to one half of the lenticular width W. The shifting of the lenticules in FIG. 15 is equivalent to electronically shifting of image pixels as shown in FIG. 11C and FIG. 12D.

If the image data indicative of the image content in the sensed image 30 as shown in FIG. 11a is provided to the display panel 60 as shown in FIG. 15, the display segment under a lenticule 52 of the viewing lenticular screen 50 will have the image content of second half of a display segment 63 and the image content of first half of the adjacent display segment 63. In this example, the second half of a display segment has the displayed image content of a compressed strip R and the first half of the adjacent display segment has the displayed image content of a compressed strip L. If we provide image data indicative of the image content in the sensed image 30 as shown in FIG. 12a to the display panel 60 as shown in FIG. 15, the second half of a display segment has the displayed image content of two compressed strips 3, 4 and the first half of the adjacent display segment has the displayed image content of two compressed strips 1, 2 (see FIG. 12d).

In sum, the present invention provides a method and an imaging system wherein a single lens in a camera can be used to capture the image of an object and the captured image can be shown on a 3D display unit 46 having an image display panel 60 and a parallax barrier 50 for viewing. The parallax barrier can be in the form of a lenticular screen or a parallax sheet. The display panel 60 can be a liquid crystal display, an OLED display, CRT display or the like. The 3D display unit 46 can be part of a mobile device, such as a smartphone, a tablet or the like. The 3D display unit 46 can be a TV set. The display 60 can also be a rear-projection screen or the like. The camera 2 can also be a stand-alone digital camera or a video camera. The processor 40 can be part of the camera 2 or part of the display 46.

As shown in FIG. 2, the image system 1 comprises three elements: a camera 2, a processor 40 and a 3D display 46 having display 60 and a viewing parallax barrier 50. The camera 2 has an image forming optical unit such as a camera lens 10 for forming an image on an image sensor 30 through a lenticular screen 20 (or equivalent parallax barrier). The processor 40 may have one or more memory units 44 configured to process the image content from the image sensor 30 in the camera and to provide the processed image content to the display unit 46. The main function of the processor 40 includes the rearrangement of the image content in each image sensor strip 32 as described in conjunction with the embodiment as illustrated in FIGS. 9, 11, 12, 13 and 14. However, the process 40 can be used to convey the image content from the image sensor 30 to the display panel 60 as illustrated in FIG. 15.

Figure 16A:
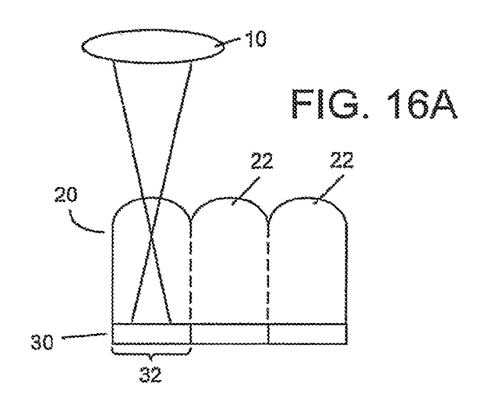
FIG. 16A illustrates using a lenticular screen as a parallax sheet on the image sensor.
Figure 16B:
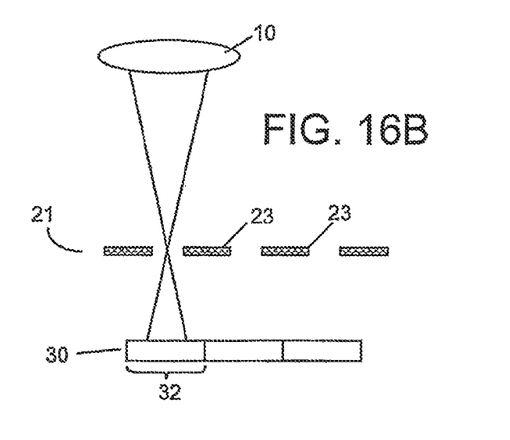
FIG. 16B illustrates using a parallax barrier as a parallax sheet on the image sensor.

It is understood that the lenticular screen as described in the present invention can be used interchangeably with a parallax barrier. As shown in FIG. 16A, the lenticular screen 20 having a plurality of lenticules 22 is placed over the image sensor 30 so that light from different parts of the camera lens 10 is directed to different parts of the image sensor 30 under each lenticule to form an image strip 32. Likewise, a parallax barrier 21 having a plurality of light-blocking segments 23 can be used to separate light from different parts of the camera lens 10 so as to form the image strips 32 on the image sensor 30 as shown in FIG. 16B.

Figure 17A:
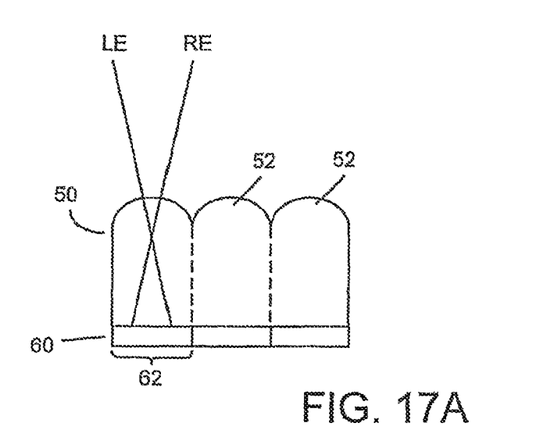
FIG. 17A illustrates using a lenticular screen as a parallax sheet on the display panel.
Figure 17B:
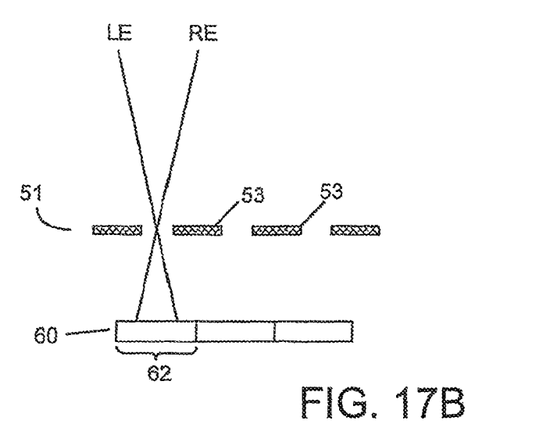
FIG. 17B illustrates using a parallax barrier as a parallax sheet on the display panel.

As shown in FIG. 17A, the lenticular screen 50 having a plurality of lenticules 52 is placed over the display panel 60 so that the image from different parts of the display segment 62 can reach different eyes of a viewer. Likewise, a parallax barrier 51 having a plurality of light-blocking segments 53 can be placed over the display panel 60 so that the image from different parts of the display segment 62 can reach different eyes of a viewer as shown in FIG. 17B.

Figure 18A:
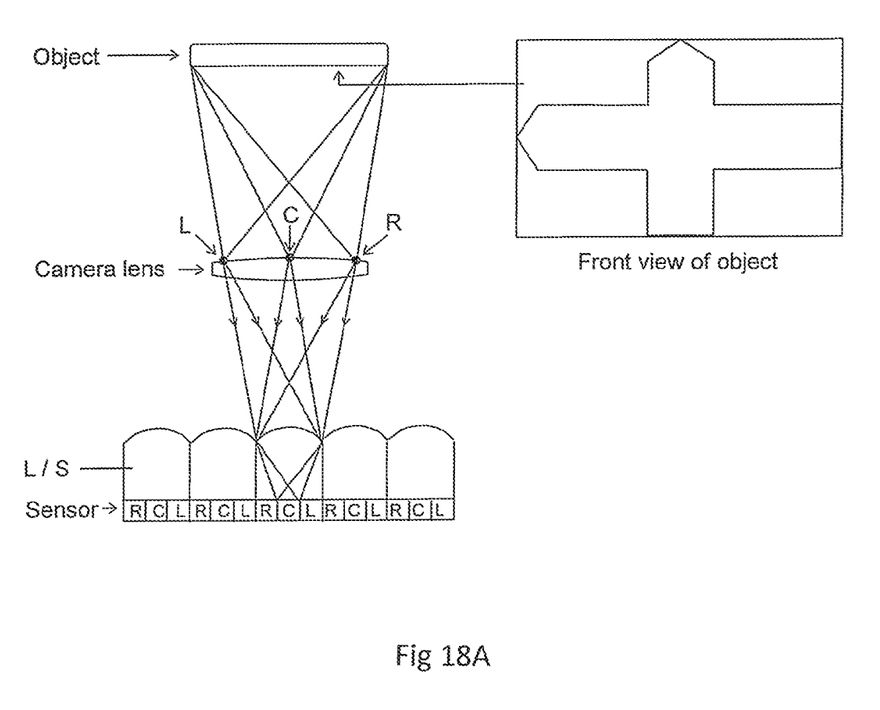
FIGS. 18A and 18B summarize the method of image arrangement for orthostereoscopic 3D viewing, according to an embodiment of the present invention.
Figure 18B:
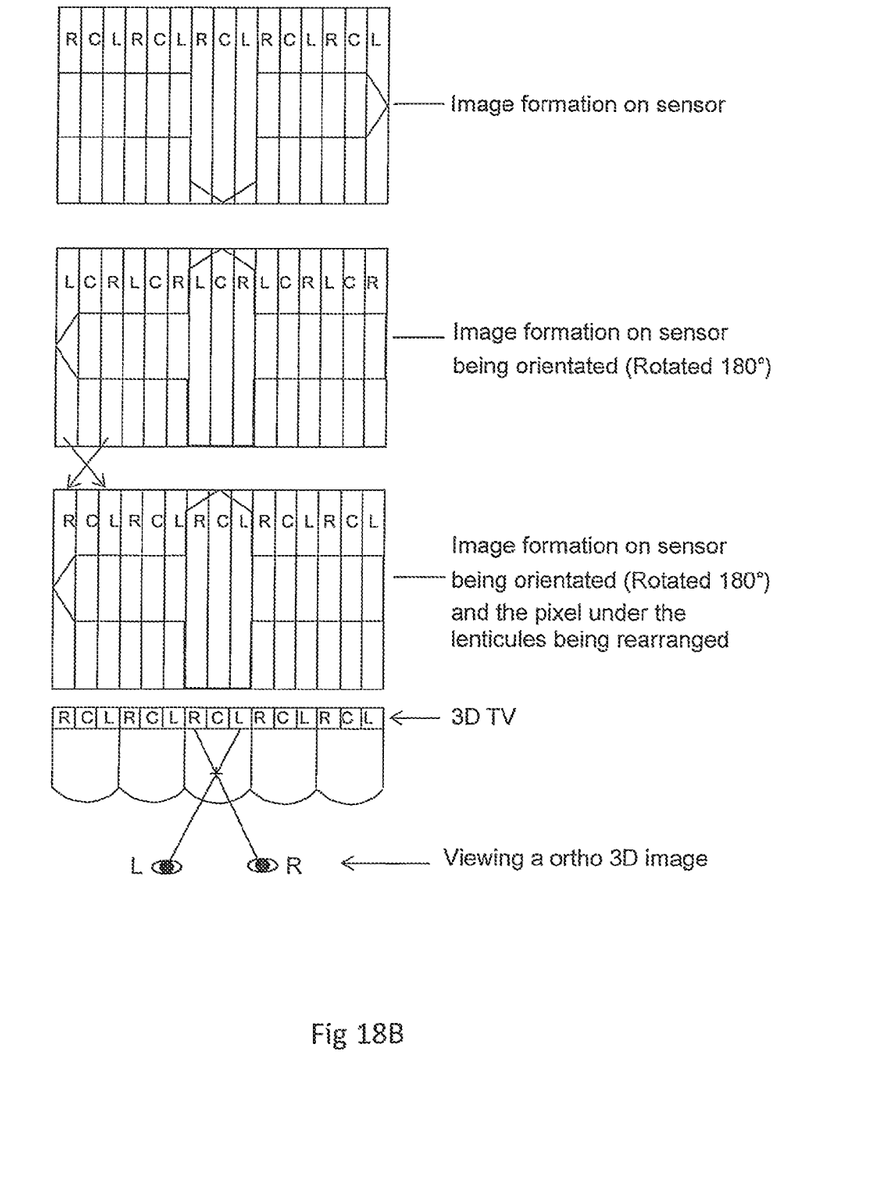

To make the present invention easier to be understood, FIGS. 18A and 18B summarize the method of image arrangement, according to an embodiment of the present invention. FIG. 18A is a schematic representation of the camera and the object as shown in FIGS. 3 and 5. FIG. 18B includes the drawings for FIGS. 6, 7, 8 and 10, showing how the image formed on the image sensor is rotated, the image content in each image strip is rearranged and provided to a display panel for viewing through a viewing lenticular screen.

In the embodiments as shown in FIGS. 9, 11, 12 and 13, the number of pixel rows under each lenticule 22 is three, two, four and five, respectively. It should be understood that the number of pixel rows can be greater than five. It can be six, seven, . . . , twenty or greater. Furthermore, in the embodiments as shown in FIGS. 3, 6 and 7, a lenticular screen 20 having five lenticules 22 covering an image sensor 30 is used to demonstrate how the image content in a pixel row is rearranged. Likewise, in the embodiment as shown in FIGS. 14 and 15, a viewing lenticular screen 50 having five lenticules 52 covering a display panel 60 is used to demonstrate how the spatial relationship between the lenticules and the image segments in a 3D display system. It should be understood that, the number of lenticules on a lenticular screen to be placed over the image sensor or the display panel is usually much greater than five, but it can be smaller than five. Thus, the number of lenticules on a lenticular screen in the camera or on the display panel can be six, . . . , hundreds, thousands or greater. Furthermore, the number of lenticules on the lenticular screen in the camera and the number of lenticules on the lenticular screen on the display panel can be the same or different. In order to minimize the Moire effect, the pixel rows might not be parallel to the longitudinal axis of the lenticules. The difference between the row direction and the longitudinal axis of the lenticules can be a few degrees to 30 degrees, for example.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. An imaging system comprising:
a camera, an image display, and an image processor, wherein
the camera comprises:
    a first parallax sheet comprising a plurality of first parallax separation units, each first parallax separation unit having a first unit width and a longitudinal axis,
    a camera lens arranged to form an image, and
    an image sensor configured to capture the image through the first parallax sheet to form a sensed image having a plurality of image strips, each image strip having a strip width substantially equal to the first unit width of the first parallax separation units;
the image processor configured to provide image data indicative of the sensed image to the image display; and
the image display comprises:
    a display panel arranged to display a displayed image indicative of the image data, the displayed image comprising a plurality of display segments, each display segment corresponding to an image strip, and each of the display segments has a segment width, and
    a second parallax sheet placed over the display panel, the second parallax sheet comprising a plurality of second parallax separation units, each second parallax separation unit having a second unit width substantially equal to the segment width of the display segments, wherein the image sensor comprises a plurality of pixel rows arranged substantially parallel to the longitudinal axis of the first parallax separation unit, and each of the image strips in the sensed image comprises a plurality of compressed image strips, each compressed image strip indicative of sensed data in a pixel row, and wherein each of the display segments comprises a plurality of display sub-segments, each of the display sub-segments corresponding to one of said plurality of compressed image strips, and wherein the image data is arranged to provide a spatial relationship between the display segments in the display image and the second parallax separation units of the second parallax sheet on the display panel, and wherein each of the compressed image strips has a sensed image content, and each of the display sub-segments has a displayed image content, and wherein said plurality of compressed image strips comprise a first compressed strip and a last compressed strip, and said plurality of display sub-segments comprise a first sub-segment and a last sub-segment, the displayed image content of the first sub-segment indicative of the sensed image content of the first compressed strip and the displayed image content of the last sub-segment indicative of the sensed image content of the last compressed strip, and wherein the second parallax sheet is arranged such that each of the second parallax separation units substantially covers one display segment, and wherein the sensed image contents in each image strip are arranged in an order according to the compressed image strips in said each image strip, and wherein the image processor is configured to arrange the image data such that the display segment under a second parallax separation unit comprises the displayed image content of the last sub-segment of a display segment and the displayed image content of the first sub-segment of an adjacent display segment.

2. The imaging system of claim 1, wherein each of the compressed image strips has a sensed image content, and each of the display sub-segments has a displayed image content, wherein the sensed image contents in each image strip are arranged in a first order according to the compressed image strips in said each image strip, and wherein the image processor is configured to change the first order into a different second order solely based on positions of the compressed image strips in said each image strip such that the displayed image contents in each display segment are arranged in the second order.

3. The imaging system of claim 2, wherein the second parallax sheet is arranged such that each of the second parallax separation units substantially covers one display segment, and wherein the second order is a reversed order of the first order.

4. The imaging system of claim 3, wherein said plurality of compressed image strips comprise a first compressed strip and a last compressed strip, and said plurality of display sub-segments comprise a first sub-segment and a last sub-segment, and wherein the image processor is configured to arrange the image data such that the displayed image content of the first sub-segment is indicative of the sensed image content of the last compressed strip, and the displayed image content of the last sub-segment is indicative of the sensed image content of the first compressed strip.

5. The imaging system of claim 2, wherein said plurality of compressed image strips comprise first N compressed strips and last N compressed strips, and said plurality of the display sub-segments comprise first N sub-segments and last N sub-segments, N being an integer greater than 1, and wherein the image processor is configured to arrange the image data such that the display image content of the first N sub-segments is indicative of the sensed image content of the last N compressed strips, and the display image content of the last N sub-segments is indicative of the sensed image content of the first N compressed strips, and wherein the second parallax sheet is arranged such that each of the second parallax separation units substantially covers one display segment.

6. The imaging system of claim 1, wherein each of the compressed image strips has a sensed image content, and each of the display sub-segments has a displayed image content, and wherein said plurality of compressed image strips comprise first N compressed strips and last N compressed strips, and said plurality of display sub-segments comprise first N sub-segments and last N sub-segments, the displayed image contents of first N sub-segments indicative of the sensed image contents of first N compressed strips and the displayed image contents of last N display sub-segments indicative of the sensed image contents of last N compressed strips, and wherein the second parallax sheet is arranged such that each of the second parallax separation units substantially covers one display segment, and wherein the sensed image contents in each image strip are arranged in an order according to the compressed image strips in said each image strip, and wherein the image processor is configured to arrange the image data such that the display segment under a second parallax separation unit comprises the displayed image contents of last N display sub-segments of a display segment and the displayed image contents of first N sub-segments of an adjacent display segment.

7. The imaging system of claim 1, wherein each of the first parallax sheet and the second parallax sheet comprises a lenticular screen, and each of the first parallax separation unit and the second parallax separation unit comprises a lenticule.

8. The imaging system of claim 1, wherein each of the first parallax sheet and the second parallax sheet comprises a parallax barrier, and each of the first parallax separation unit and the second parallax separation unit comprises a barrier unit.

9. The imaging system of claim 1, wherein one of the first parallax sheet and the second parallax sheet comprises a lenticular screen, and another one of the first parallax sheet and the second parallax sheet comprises a parallax barrier.

10. The imaging system of claim 1, wherein the image display is provided in one of a mobile device, a tablet and a television set.

11. The imaging system according to claim 2, wherein said plurality of compressed image strips comprise a first compressed strip and a last compressed strip, and said plurality of display sub-segments comprise a first sub-segment and a last sub-segment, and wherein the image processor is configured to arrange the image data such that the display image content of the first sub-segment is indicative of the sensed image content of the last compressed strip, and the display image content of the last sub-segment is indicative of the sensed image content of the first compressed strip, and wherein the second parallax sheet is arranged such that each of the second parallax separation units substantially covers one display segment.

12. The imaging system according to claim 11, wherein said plurality of compressed image strips further comprise a middle compressed strip located between the first compressed strip and the last compressed strip, and said plurality of the display sub-segments comprise a middle sub-segment located between the first sub-segment and the last sub-segment, and wherein the image processor is configured to arrange the image data such that the display image content of the middle sub-segment is indicative of the sensed image content of the middle compressed strip.

13. An imaging display system comprising:
an image display, and an image processor configured to provide image data to the image display, the image data indicative of a sensed image, wherein the sensed image is formed by a camera lens and captured in an image sensor through a first parallax sheet, the first parallax sheet comprising a plurality of first parallax separation units, each first parallax separation unit having a first unit width and a longitudinal axis; and wherein the image display comprises:
a display panel arranged to display a displayed image indicative of the image data, the displayed image comprising a plurality of display segments, each display segment corresponding to an image strip, and each of the display segments has a segment width, and
a second parallax sheet placed over the display panel, the second parallax sheet comprising a plurality of second parallax separation units, each second parallax separation unit having a second unit width substantially equal to the segment width of the display segment, wherein the image sensor comprises a plurality of pixel rows arranged substantially parallel to the longitudinal axis of the first parallax separation unit, and each of the image strips in the sensed image comprises a plurality of compressed image strips, each compressed image strip indicative of sensed data in a pixel row, and wherein each of the display segments comprises a plurality of display sub-segments, each of the display sub-segments corresponding to one of said plurality of compressed image strips, and wherein the image data is arranged to provide a spatial relationship between the display segments in the display image and the second parallax separation units of the second parallax sheet on the display panel, and wherein each of the compressed image strips has a sensed image content, and each of the sub-segments has a displayed image content, wherein the sensed image contents in each image strip are arranged in a first order according to the compressed image strips in said each image strip, and wherein the image processor is configured to change the first order into a different second order solely based on positions of the compressed image strips in said each image strip such that the displayed image contents in each display segment are arranged in the second order, wherein each of the compressed image strips has a sensed image content, and each of the display sub-segments has a displayed image content, and wherein said plurality of compressed image strips comprise a first compressed strip and a last compressed strip, and said plurality of display sub-segments comprise a first sub-segment and a last sub-segment, the displayed image content of the first sub-segment indicative of the sensed image content of the first compressed strip and the displayed image content of the last sub-segment indicative of the sensed image content of the last compressed strip, and wherein the second parallax sheet is arranged such that each of the second parallax separation units substantially covers one display segment, and wherein the sensed image contents in each image strip are arranged in an order according to the compressed image strips in said each image strip, and wherein the image processor is configured to arrange the image data such that the display segment under a second parallax separation unit comprises the displayed image content of the last sub-segment of a display segment and the displayed image content of the first sub-segment of an adjacent display segment.

14. The imaging display system of claim 13, wherein the second parallax sheet is arranged such that each of the second parallax separation units substantially covers one display segment, and wherein the second order is a reversed order of the first order.

15. The imaging display system of claim 13, wherein the second parallax sheet comprises a lenticular screen, and the second parallax separation unit comprises a lenticule.

16. The imaging display system of claim 13, wherein the second parallax sheet comprises a parallax barrier, and the second parallax separation unit comprises a barrier unit.

* * * * *